(12) United States Patent  
Hu et al.

(10) Patent No.: US 8,634,835 B2  
(45) Date of Patent: Jan. 21, 2014

(54) METHOD, DEVICE, AND SYSTEM FOR INFORMATION PROCESSING

(71) Applicant: Huawei Technologies Co., Ltd., Shenzhen (CN)

(72) Inventors: Weizhi Hu, Shenzhen (CN); Lingling Gao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/675,879

(22) Filed: Nov. 13, 2012

(65) Prior Publication Data

US 2013/0065595 A1 Mar. 14, 2013

Related U.S. Application Data

(63) Continuation of application No. PCT/CN2011/074018, filed on May 13, 2011.

(30) Foreign Application Priority Data

May 13, 2010 (CN) .......................... 2010 1 0179799

(51) Int. Cl.  
*H04Q 7/20* (2006.01)

(52) U.S. Cl.  
USPC ........... 455/436; 455/434; 455/437; 455/439; 455/440; 370/331; 370/329; 370/334; 370/338; 370/330

(58) Field of Classification Search  
USPC .................. 455/436, 437, 438, 439  
See application file for complete search history.

(56) References Cited

U.S. PATENT DOCUMENTS

| | | | | |
|---|---|---|---|---|
| 8,184,594 | B2 * | 5/2012 | Li et al. | .......................... 370/331 |
| 2010/0027507 | A1 | 2/2010 | Li et al. | |

FOREIGN PATENT DOCUMENTS

| | | |
|---|---|---|
| CN | 101052208 A | 10/2007 |
| CN | 101212776 A | 7/2008 |
| CN | 101489273 A | 7/2009 |
| CN | 101635968 A | 1/2010 |
| CN | 101668320 A | 3/2010 |
| CN | 101917747 A | 12/2010 |
| EP | 1 594 334 A1 | 11/2005 |

(Continued)

OTHER PUBLICATIONS

3rd Generation Partnership Project; Technical Specification Group Access Network; Evolved Universal Terrestrial Radio Access (E-UTRA) and Evolved Universal Terrestrial Radio Access Network (E-UTRAN); Overall description; Stage 2 (Release 8), 3GPP TS 36.300 V8.12.0, Mar. 2010, 149 pages.

(Continued)

*Primary Examiner* — Charles Appiah  
*Assistant Examiner* — Randy Peaches  
(74) *Attorney, Agent, or Firm* — Slater & Matsil, L.L.P.

(57) ABSTRACT

Embodiments of the present invention disclose an information processing method. A first base station receives a handover request message from a second base station. The first base station determines whether the handover request message is an initial handover request message directly sent by a source base station in a handover process or a forwarded handover request message. If a judging result is that the handover request message is the forwarded handover request message, the first base station saves a user equipment, context in the handover request message so as to become a prepared base station of the UE.

10 Claims, 3 Drawing Sheets

(56) References Cited

FOREIGN PATENT DOCUMENTS

| EP | 1 986 454 A1 | | 10/2008 |
|---|---|---|---|
| EP | 1986454 A1 | * | 10/2008 |
| EP | 2 148 538 A2 | | 1/2010 |
| WO | WO 2008/154802 A1 | | 12/2008 |

OTHER PUBLICATIONS

3$^{rd}$ Generation Partnership Project; Technical Specification Group Radio Access Network; Evolved Universal Terrestrial Radio Access (E-UTRA); User Equipment (UE) procedures in idle mode (Release 9), 3GPP TS 36.304, V9.2.0, Mar. 2010, 32 pages.

3$^{rd}$ Generation Partnership Project; Technical Specification Group Radio Access Network; Evolved Universal Terrestrial Radio Access (E-UTRA); Radio Resource Control (RRC); Protocol specification (Release 8), 3GPP TS 36.331, V8.9.0, Mar. 2010, 211 pages.

3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 9), 3GPP TS 23.401 V9.4.0, Mar. 2010, 258 pages.

3$^{rd}$ Generation Partnership Project; Technical Specification Group Radio Access Network; Evolved Universal Terrestrial Radio Access (E-UTRA); Physical Channels and Modulation (Release 9), 3GPP TS 36.211 V9.1.0 Mar. 2010, 85 pages.

3$^{rd}$ Generation Partnership Project; Technical Specification Group Radio Access Network; Evolved Universal Terrestrial Radio Access Network (E-UTRAN); S1 Application Protocol (S1AP) (Release 9), 3GPP TS 36.413 V9.2.2, Apr. 2010, 244 pages.

3$^{rd}$ Generation Partnership Project; Technical Specification Group Radio Access Network; Evolved Universal Terrestrial Radio Access Network (E-UTRAN); Architecture description (Release 9), 3GPP TS 36.401, V9.1.0 Mar. 2010, 19 pages.

3$^{rd}$ Generation Partnership Project; Technical Specification Group Radio Access Network; Evolved Universal Terrestrial Radio Access Network (E-UTRAN); X2 application protocol (X2AP) (Release 9), 3GPP TS 36.423 V9.2.0, Mar. 2010, 120 pages.

First Chinese Office Action of Chinese Application No. 201010179799.7, mailed Aug. 31, 2012, 11 pages.

International Search Report received in International Application No. PCT/CN2011/074018, mailed Aug. 25, 2011, 3 pages.

Written Opinion of the International Searching Authority received in International Application No. PCT/CN2011/074018, mailed Aug. 25, 2011, 6 pages.

Second Office Action of Chinese Application No. 201010179799.7 mailed May 15, 2013, 12 pages. (Partial Translation).

Extended European Search Report received in Application No. 11780216.5-1858, Applicant: Huawei Technologies Co., Ltd., mailed May 10, 2013, 6 pages.

* cited by examiner

METHOD, DEVICE, AND SYSTEM FOR INFORMATION PROCESSING

CROSS-REFERENCE TO RELATED APPLICATIONS

This application is a continuation of International Application No. PCT/CN2011/074018, filed on May 13, 2011, which claims priority to Chinese Patent Application No. 201010179799.7, filed on May 13, 2010, both of which are hereby incorporated by reference in their entireties.

TECHNICAL FIELD

The present invention relates to the field of communication technologies, and in particular, to a method, a device, and a system for information processing.

BACKGROUND

A information processing process in a handover process generally is: A source base station sends a handover request message to multiple target base stations; after receiving the handover request message, a target base station prepares handover resources for a user equipment (User Equipment, abbreviated as UE) that needs to handover; and after receiving handover request response messages of multiple target base stations, the source base station selects an relatively ideal target base station, and sends a handover command to the UE.

In a processing process of handover information in the prior art, the source base station sends the handover request message to multiple target base stations, and the multiple target base stations need to prepare resources for the UE, which leads to waste of resources.

SUMMARY OF THE INVENTION

A problem that needs to be solved by embodiments of the present invention is to provide a method, a device, and a system for information processing, which can improve a utilization ratio of communication resources.

To solve the foregoing technical problem, in one aspect, the present invention provides an information processing method. A first base station receives a handover request message from a second base station. The first base station judges whether the handover request message is an initial handover request message directly sent by a source base station in a handover process or a forwarded handover request message. The first base station saves a user equipment UE context in the handover request message so as to become a base station that can be accessed (prepared) by the UE if a judging result is that the handover request message is the forwarded handover request message.

In another aspect, the present invention provides an information processing device. A receiving module is configured to receive a handover request message from a second base station. A judging module is configured to judge whether the handover request message is an initial handover request message directly sent by a source base station in a handover process or a forwarded handover request message. A storing module is configured to save a user equipment UE context in the handover request message in a case that a judging result is that the handover request message is the forwarded handover request message.

In another aspect, the present invention provides an information processing system, which includes the foregoing-described device and a base station which sends a handover request message.

In the embodiments of the present invention, after receiving the handover request message, the first base station judges whether the message is a forwarded handover request message; if the judging result is yes, the first base station saves the UE context in the message so as to become a base station that can be accessed by the UE, so that in a case that handover failure occurs, a reestablishment success ratio is improved, and a resource utilization ratio is improved.

BRIEF DESCRIPTION OF THE DRAWINGS

To describe technical solutions in the embodiments of the present invention or in the prior art more clearly, the accompanying drawings required in description of the embodiments or the prior art are briefly introduced in the following. Apparently, the accompanying drawings in the following description are merely some embodiments of the present invention; and those skilled in the art can further derive other drawings based on these accompanying drawings without any creative effort.

DETAILED DESCRIPTION OF ILLUSTRATIVE EMBODIMENTS

The technical solutions in the embodiments of the present invention are described clearly and completely in the following with reference to accompanying drawings in the embodiments of the present invention. Apparently, the described embodiments are only a part of embodiments of the present invention, rather than all the embodiments of the present invention. Based on the embodiments of the present invention, all other embodiments obtained by persons of ordinary skill in the art without making any creative effort shall fall within the protection scope of the present invention.

In order to make the foregoing objectives, characteristics and advantages of embodiments of the present invention more obvious and comprehensible, the embodiments of the present invention are further illustrated in detail in the following with reference to the accompanying drawings and specific implementation manners.

Figure 1:
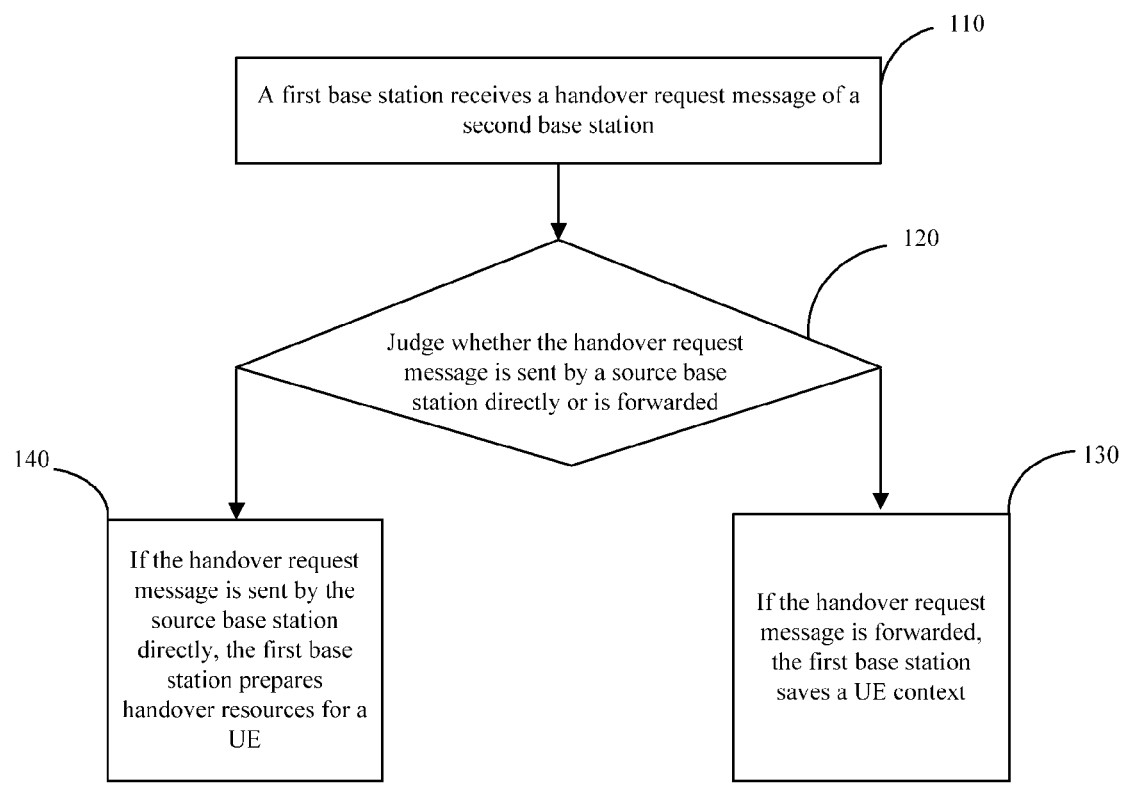
FIG. 1 is a schematic flow chart of an information processing method according to an embodiment of the present invention.

FIG. 1 is a schematic flow chart of an information processing method according to an embodiment of the present invention. As shown in FIG. 1, the information processing method in this embodiment of the present invention includes the following steps.

Step 110: A first base station receives a handover request message from a second base station.

In a case that the second base station sends the handover request message to the first base station, the first base station receives the handover request message sent by the second base station. In a long term evolution (LTE, Long Term Evolution) system, the first base station may receive the handover request message from the second base station through an X2 interface.

It can be understood that the second base station may be a source base station in a handover process, and in this case, the first base station is a handover target base station, and the handover request message which is sent by the second base station and received by the first base station is the handover request message sent by the source base station directly; or, the second base station may not be the source base station in the handover process, and in this case, the handover request message is forwarded.

Step 120: The first base station judges whether the handover request message is an initial handover request message directly sent by the source base station in the handover process or a forwarded handover request message.

According to the received handover request message, the first base station judges whether the handover request message is the initial handover request message sent directly by the second base station that serves as the source base station, or is a handover request message which is forwarded to the first base station after the second base station receives the handover request message sent by another base station. If a judging result is that the handover request message is forwarded, step 130 may be performed; in addition, optionally, if the judging result is that the handover request message is the initial handover request message, step 140 may be performed.

Step 130: The first base station saves a UE context (Context).

If the judging result of step 120 is that the handover request message is the forwarded handover request message, the first base station saves the user equipment UE context in the handover request message so as to become a base station that can be accessed by the UE (Prepared eNodeB).

In this step, if the first base station judges that the received handover request message is forwarded, it indicates that the second base station is not the source base station in the handover process, and the first base station is not the target base station in the handover process. In this case, the first base station does not need to prepare the resources for the UE to handover to the base station (handover resources). However, the first base station may save the UE context in the handover request message so as to become the base station that can be accessed by the UE.

Step 140: The first base station sends a handover request response message to the second base station, and prepares handover resources for the UE.

If the judging result of step 120 is that the handover request message is not the forwarded handover request message, but is the initial handover request message sent directly by the source base station in the handover process, it indicates that the first base station is an optimal base station selected by the second base station among neighboring base stations of the second base station. In this case, the first base station prepares handover resources for the UE, and sends the handover request response message to the second base station. In addition, the first base station may further forward the handover request message to its neighboring base station so that the neighboring base station that receives the handover request message becomes the prepared base station. In this way, if the handover from the UE to the first base station fails, the UE may further initiate reestablishment to these base stations that become prepared base stations, thereby shortening reestablishment time and improving reestablishment efficiency.

It can be understood that, compared with the prior art, the source base station may select the optimal base station among multiple neighboring base stations as a direct sending object of the initial handover request message. It is assumed that the second base station is the source base station, a basis that it selects the optimal base station among its neighboring base stations may be a measurement report sent by the UE. For example, the second base station (source base station) selects the base station with a frequency where the UE is located and where signal strength and signal quality are optima according to the measurement report sent by the UE, and sends the handover request message to the selected optimal base station.

In this embodiment, after the first base station receives the handover request message sent by the second base station, if it is judged that the handover request message is forwarded, the first base station does not need to prepare handover resources for the UE, but retains the UE context information in the handover request message, thereby becoming the prepared base station of the UE. In this way, if handover fails, the UE can succeed in reestablishing when initiating reestablishment to the first base station.

Further, the source base station may select the optimal base station to perform sending of the initial handover request message, in this way, that multiple base stations receive the initial handover request message and prepare handover resources is avoided, thereby improving a utilization ratio of communication resources on the whole. Accordingly, in this case, if the first base station is the optimal base station, the handover request message it received is the initial handover request message sent by the source base station directly.

Figure 2:
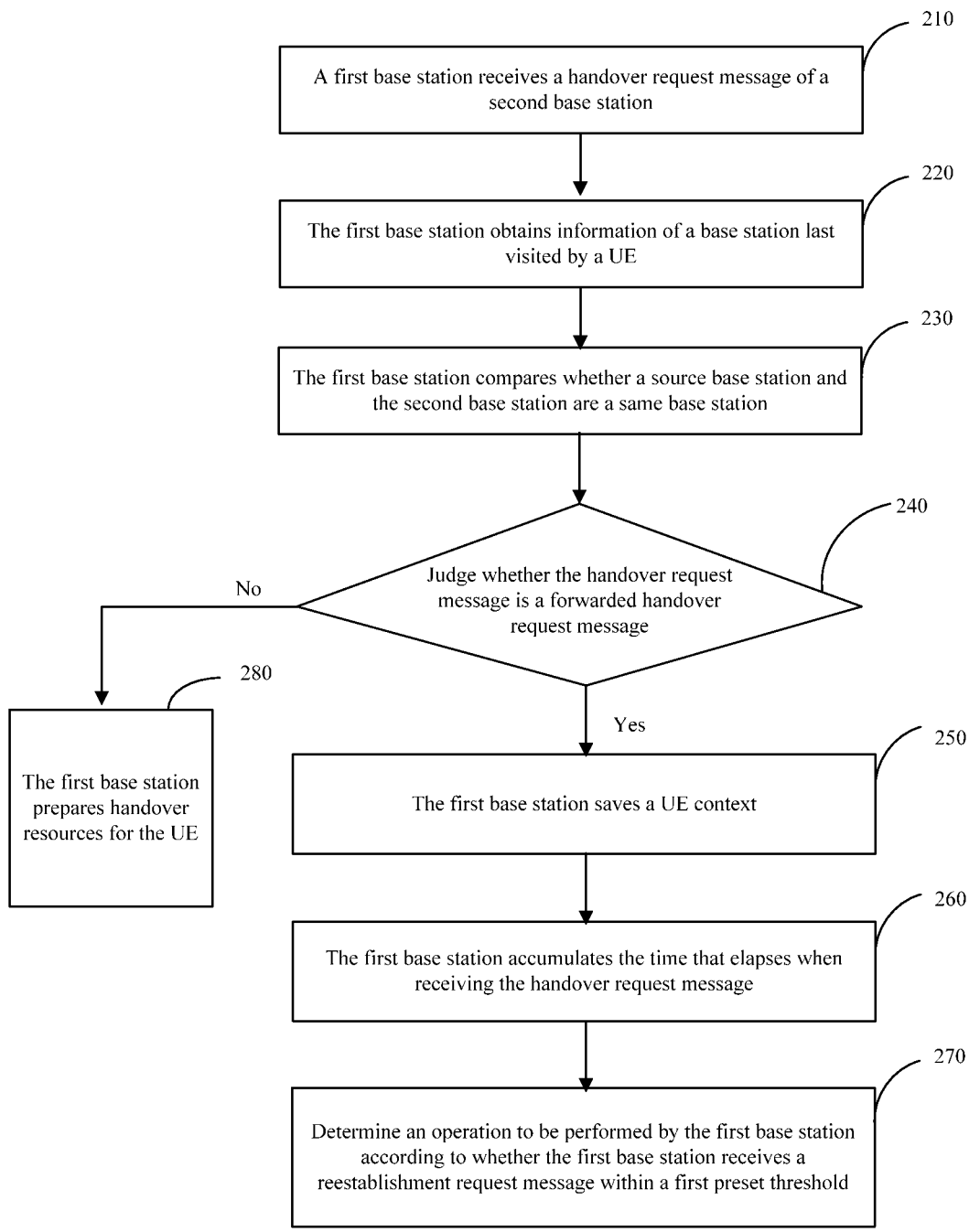
FIG. 2 is a schematic flow chart of an information processing method according to another embodiment of the present invention.

FIG. 2 is a schematic flow chart of an information processing method according to another embodiment of the present invention. As shown in FIG. 2, the information processing method in another embodiment of the present invention includes the following steps.

Step 210: A first base station receives a handover request message from a second base station.

For a specific receiving method, reference may be made to step 110 of the foregoing embodiment.

Step 220: The first base station obtains information of a base station last visited by a UE.

It can be understood that, the base station last visited by the UE is a base station that establishes the handover request message, and is also the base station that originally forms the handover request message and sends it out, namely, is a source base station of the UE in a handover process. A history information element which is of the UE and is in the handover request message sent by the source base station includes the information of a base station visited by the UE. That is, the information of the base station last visited by the UE can be obtained from the handover request message.

In this step, the first base station obtains the information of the base station last visited by the UE from the history information element which is of the UE and is in the received handover request message, and the last visited base station is the source base station that originally sends the handover request message.

Step 230: Compare whether the source base station and the second base station are a same base station.

According to the sending interface of the received handover request message, the first base station may know the second base station that sends the message. Further, the first base station may compare whether a base station identifier of the second base station and a base station identifier of the source base station that is obtained in step 220 are consistent. If the two are consistent, it indicates that the second base station and the source base station are the same base station; if they are not consistent, it indicates that the second base station and the source base station are not the same base station.

Step 240: Judge whether the handover request message is a forwarded handover request message.

If the source base station and the second base station are the same base station, the handover request message is an initial handover request message sent by the source base station directly in the handover process; otherwise, the handover request message is the forwarded handover request message.

If a judging result is that the handover request message is forwarded, perform step 250; if the judging result is that the handover request message is the initial handover request message sent by the source base station directly in the handover process, perform step 280.

Step 250: The first base station saves a UE context.

For a specific receiving method, reference may be made to step 130 in the foregoing embodiment.

In this embodiment, the following may further be included.

Step 260: The first base station accumulates the time that elapses when receiving the handover request message.

In this step, the first base station may start timing when receiving the handover request message and accumulate the time that elapses after the first base station receives the handover request message. It may be aware that, in this step, a timer or a similar method may be applied to accumulate time.

Step 270: Decide an operation performed by the first base station according to whether the first base station receives a reestablishment request message when the accumulated time is within a first preset threshold.

If the first base station receives the reestablishment request message from the UE when the accumulated time does not reach the first preset threshold, the first base station sends a reestablishment command to the UE. If the first base station receives the reestablishment request sent by the UE, it indicates that the UE fails in the handover and needs to initiate reestablishment to the first base station. In this case, because the first base station saves the UE context, the first base station is a prepared base station of the UE, which enables the UE to perform reestablishment to the first base station. In this case, the first base station may send the reestablishment command to the UE so that the UE performs reestablishment to the first base station.

It can be understood that, if the source base station sends the handover request response message to the UE in the UE handover process, and the UE does not receive the handover request response message due to an air interface environment or another reason, the UE handover may fail; or, when the target base station sends the handover request response message to the source base station, and the message is lost, the UE handover may fail. In this case, the UE needs to send a reestablishment request to another base station. That is, the UE may send a reestablishment request to the first base station in a case that the handover fails; conversely, it can be understood as that, if the UE does not send the reestablishment request to the first base station within certain time, it can basically indicate that the UE succeeds in the handover.

Specifically, the time threshold may be equivalent to or a little longer than the time that the UE succeeds in handing over to the target base station. When the time accumulated after the first base station receives the handover request message reaches the first preset threshold, the first base station may think that the UE hands over successfully, and the first base station does not need to keep saving the handover request message to retain the UE context information. Therefore, when the time accumulated after the first base station receives the handover request message reaches the first preset threshold, if the first base station still does not receive the reestablishment request of the UE, the first base station may delete the handover request message.

Step 280: If the judging result is that the handover request message is not forwarded, the first base station prepares handover resources for the UE.

For a specific method, reference is made to step 140 in the foregoing embodiment.

In this embodiment, through the source base station and the target base station in the handover request message, the first base station may judge that the message is forwarded, and does not need to prepare handover resources for the UE. Meanwhile, the first base station may further accumulate time after receiving the handover request message. If the first base station does not receive the reestablishment request when the accumulated time exceeds the preset threshold, the first base station deletes the handover request message. Therefore, in this embodiment, on the premises that successful reestablishment is ensured when the UE handover fails, resources used by the UE in the handover and reestablishment process are further reduced, and a utilization ratio of resources is improved.

In another embodiment of the present invention, the following step may further be added on the basis of the last two embodiments:

The first base station forwards the handover request message to a neighboring base station of the first base station, where the handover request message carries the number of times that the handover request message is forwarded.

In this step, the first base station may forward the handover request message to the neighboring base station through a message (such as a private message), where the handover request message carries the number of times that the handover request message is forwarded. It can be understood that, the handover request message is formed at the source base station and sent to the second base station, and forwarded by the second base station to the first the base station, and then forwarded by the first base station to the neighboring base station. The number of times of forwarding may increase when the message is forwarded each time.

In this embodiment, the following may further be included.

When the UE is a UE moving at a high speed, the first base station forwards the handover request message to a next base station in a moving direction of the UE.

For example, when the UE moves along a railway at a high speed, after receiving the handover request message, the first base station may judge the moving direction of the UE first, finds a base station with a moving direction which is the same as or close to the moving direction of the UE among neighboring base stations of the first base station, and forwards the handover request message to the base station.

In this embodiment, the following may further be included.

The first base station obtains the number of times that the handover request message is forwarded, and compares it with a preset threshold of the number of times of forwarding. If the number of times of forwarding is less than the threshold of the number of times of forwarding, the first base station adds one to the number of times in the handover request message, and forwards the handover request message to the neighboring base stations of the first base station.

In this step, if the judging result is that the handover request message is the forwarded handover request message, the first base station obtains the number of times that the handover request message is forwarded, where the number of times is carried in the handover request message, and compares it with the preset threshold of the number of times of forwarding. If the number of times of forwarding is less than the threshold of the number of times of forwarding, the first base station adds one to the number of times in the handover request message, and forwards the handover request message to the neighboring base stations of the first base station.

In this embodiment, when the first base station forwards the handover request message, the message carries the number of times that the message is forwarded; when receiving the message, the first base station obtains the number of times that the message is forwarded, and compares it with the preset threshold. In this way, the number of times of that the message is forwarded can be controlled, and a balance to a certain degree is achieved between a utilization efficiency of the resources stored in the base station and the improving of a UE reestablishment success ratio.

In addition, in a case that the UE is moving at a high speed, the message may be forwarded to the base station in the moving direction of the UE, and a base station scope where the UE can initiate reestablishment may be judged in advance, thereby further improving the UE reestablishment success ratio.

Figure 3:
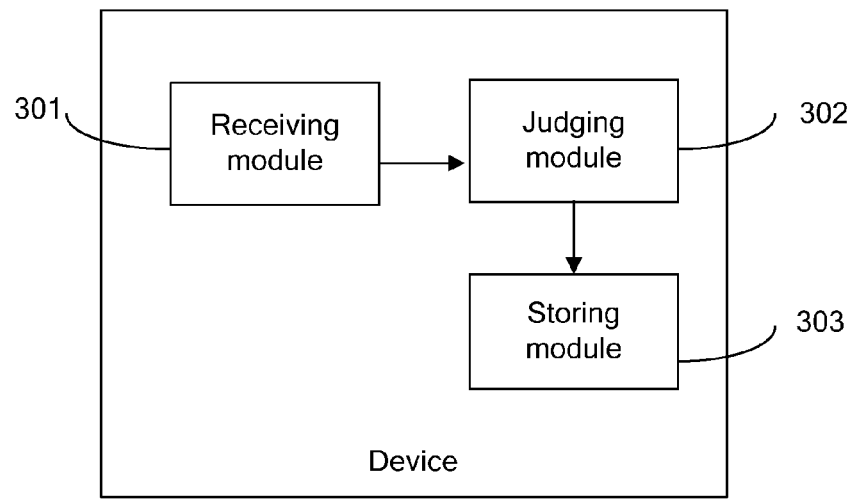
FIG. 3 is a schematic structural diagram of an information processing device according to an embodiment of the present invention.

FIG. 3 is a schematic structural diagram of an information processing device according to an embodiment of the present invention. As shown in FIG. 3, an information processing device is provided in this embodiment of the present invention. The information processing device may be a base station. The device includes a receiving module 301, a judging module 302, and a storing module 303.

The receiving module 301 is configured to receive a handover request message sent by another base station.

It is assumed that the information processing device is a first base station, and the base station that sends the handover request message to the device is a second base station. The second base station may be a source base station in a handover process, and may also not be the source base station. In this case, the receiving module 301 receives the handover request message sent by the second base station.

The judging module 302 is configured to judge whether the handover request message is an initial handover request message directly sent by the source base station in the handover process or a forwarded handover request message.

Specifically, the judging module 302 may, according to the received handover request message, judge whether the handover request message is the initial handover request message directly sent by the source base station or the forwarded handover request message.

The storing module 303 is configured to save a user equipment UE context in the handover request message in a case that a judging result of the judging module 302 is that the handover request message is the forwarded handover request message.

If the judging module 302 judges that the handover request message received by the receiving module is forwarded, it indicates that the second base station is not the source base station, and the device (such as the first base station) is also not an initial target base station. Therefore, in this case, the first base station does not need to prepare handover resources for the UE to handover to the first base station. To improve the efficiency of possible reestablishment, the storing module 303 may save the UE context in the handover request message, so that the device (such as the first base station) is enabled to become a base station that can be accessed by the UE.

In the technical solutions of this embodiment, after the receiving module receives the handover request message, if the judging module judges that the handover request is forwarded, it is not necessary to prepare handover resources for the UE, while the UE context information in the handover request message is stored, so that the device (such as the first base station) is enabled to become the base station that can be accessed by the UE. In this way, when the UE initiates reestablishment to the first base station, because corresponding resources are prepared beforehand, the reestablishment time can be shortened, and the reestablishment efficiency can be improved.

Optionally, as described in the foregoing, the device may be a target base station (in this case, the judging result of the judging module is that the handover request message is the initial handover request message directly sent by the source base station in the handover process), and may also be the neighboring base station of the target base station. In a case that the device is the target base station, the device may further include: a processing module, which is configured to, in the case that the judging result of the judging module is that the handover request message is the initial handover request message directly sent by the source base station in the handover process, send a handover request response message to the source base station and prepare handover resources for the UE.

Further, when the device is the target base station, a third forwarding module may further be included, which is configured to forward the handover request message to the neighboring base station of the device. For descriptions of corresponding technical effects, reference may be made to descriptions of the method embodiment.

Figure 4:
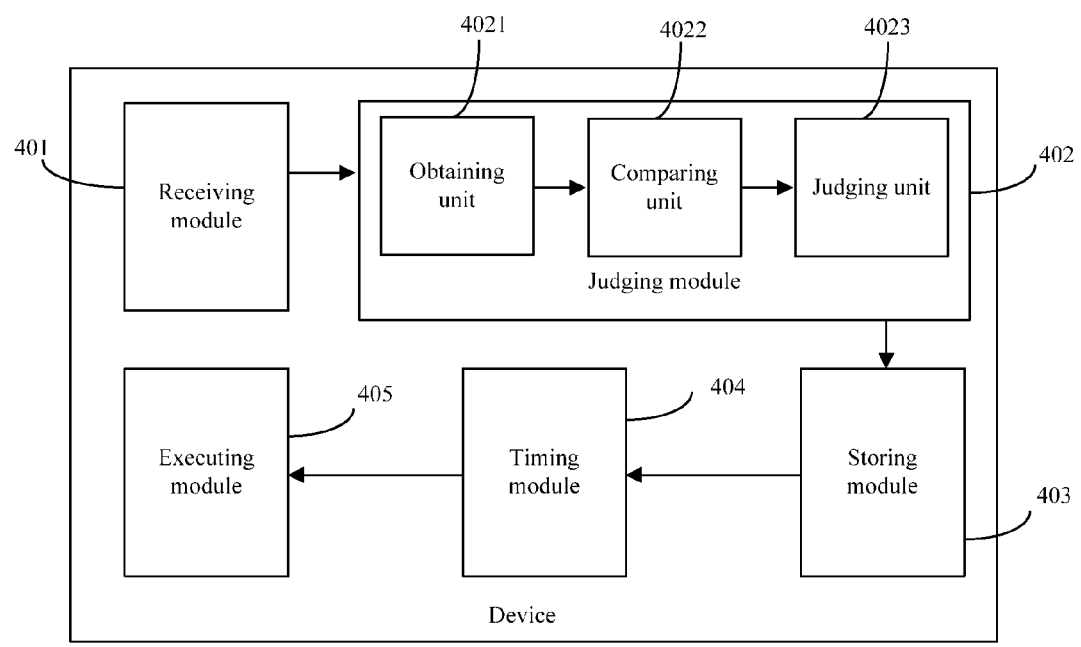
FIG. 4 is a schematic structural diagram of an information processing device according to an embodiment of the present invention.

FIG. 4 is a schematic structural diagram of an information processing device according to an embodiment of the present invention. As shown in FIG. 4, an information processing device is provided in this embodiment of the present invention. The device may be a base station. The device includes: a receiving module 401, a judging module 402, and a storing module 403. The functions of the modules are similar to those in the foregoing embodiment. The judging module 402 further includes: an obtaining unit 4021, a comparing unit 4022, and a judging unit 4023. In addition, the device in this embodiment may further include: a timing module 404 and an executing module 405.

The timing module 404 is configured to accumulate the time that elapses when the receiving module receives a handover request message.

If the judging module judges that the handover request message is forwarded, the timing module may start timing when the receiving module receives the handover request message, and accumulate the time that elapses after the receiving module receives the handover request message. It can be aware that, the timing module may be a timer or a similar module which can accumulate time.

The executing module 405 is configured to: send a reestablishment command to the UE if the first base station receives a reestablishment request message from the UE when the time accumulated by the timing module does not reach a first preset threshold; delete the handover request message if the first base station still does not receive the reestablishment request message from the UE when the time accumulated by the timing module reaches the first preset threshold.

If the first base station receives the reestablishment request message from the UE when the time accumulated by the timing module does not reach the first preset threshold, the executing module sends the reestablishment command to the UE. If the UE does not send the reestablishment request to the first base station within certain time, it can basically indicate that the UE hands over successfully, and the executing module may delete the handover request message.

In this embodiment, the judging module 402 may specifically include: an obtaining unit 4021 is configured to obtain the information of the base station last visited by the UE from a UE history information element in the received handover request message, where the last visited base station is the source base station.

It can be understood that, the base station last visited by the UE is a base station that establishes the handover request message, and is also the base station that originally forms the handover request message and sends it out, namely, the base station last visited by the UE is the source base station of the UE. The UE history information element in the handover request message sent by the source base station includes information of a base station visited by the UE. That is, the information of the base station last visited by the UE can be obtained from the handover request message.

In this step, the obtaining unit obtains the information of the base station last visited by the UE from the UE history information element in the received handover request message, and the last visited base station is the source base station that originally sends the handover request message.

The comparing unit 4022 is configured to compare whether the source base station and the second base station are a same base station.

The comparing unit may compare a base station identifier of the second base station with a base station identifier of the source base station. If the two identifiers are consistent, it indicates that the second base station and the source base station are the same base station; if the two identifiers are not consistent, it indicates that the second base station and the source base station are not the same base station.

The judging unit 4023 is configured to, in a case that the source base station and the second base station are the same base station, judge that the handover request message is an initial handover request message sent by the source base station directly in the handover process; otherwise, judge that the handover request message is a forwarded handover request message.

If the source base station and the second base station are the same base station, the handover request message is the initial handover request message sent by the source base station directly in the handover process; otherwise, the handover request message is the forwarded handover request message.

In this embodiment, the device may further include: a first forwarding module is configured to forward the handover request message to the neighboring base station of the device, where the handover request message carries the number of times that the handover request message is forwarded.

The first forwarding module may forward the handover request message from the first base station to the neighboring base station through a private message, where the handover request message carries the number of times that the handover request message is forwarded.

In addition, in this embodiment, the device may further include: a comparing module, configured to, when a judging result is that the handover request message is the forwarded handover request message, obtain the number of times that the handover request message is forwarded, where the number of times is carried in the handover request message, and compare the number of times with a preset threshold of the number of times of forwarding.

A second forwarding module, configured to, when the number of times of forwarding is less than the threshold of the number of times of forwarding, add one to the number of times in the handover request message, and forward the handover request message to the neighboring base station of the device.

In this embodiment, when the first forwarding module forwards the handover request message, the message carries the number of times that the message is forwarded; and when receiving the message, the comparing module obtains the number of times that the message is forwarded, and compares it with the preset threshold. In this way, the number of times that the message is forwarded can be controlled, and a balance to a certain degree is achieved between the utilization of the resources stored in the base station and the improving of a UE reestablishment success ratio.

In addition, the foregoing method and device embodiments are described from a perspective of the device (base station) that receives the handover request message. In fact, this application may also be described from a perspective of the source base station.

For example, from the perspective of the source base station, it may select an optimal base station among multiple neighboring base stations as a direct sending object of the initial handover request message. It is assumed that the second base station is the source base station, a basis that it selects an optimal base station among neighboring base stations may be a measurement report sent by the UE. For example, the second base station (source base station) selects a base station with a frequency where the UE is located and where signal strength and signal quality are optimal according to the measurement report sent by the UE, and sends the handover request message to the selected optimal base station. The foregoing functions may be implemented by corresponding software or software and their combination.

An embodiment of the present invention provides an information processing system, which includes the device as described in the foregoing and a base station which sends a handover request message.

An LTE system is taken as an example for describing in the embodiment of the present invention. In the LTE system, a communication device may be a base station. It can be understood that, it may also be applied in systems such as a wideband code division multiple access (Wideband Code Division Multiple Access, abbreviated as WCDMA) system, a global system for mobile communications (Global System For Mobile Communications, abbreviated as GSM), time division-synchronous code division multiple access (Time Division-Synchronous Code Division Multiple Access, abbreviated as TD-SCDMA), code division multiple access CDMA2000, and worldwide interoperability for microwave access (Worldwide Interoperability for Microwave Access, abbreviated as WIMAX). In another system, the communication device may be a base station, or a base station control device, or another network device which can implement similar functions.

It should be noted that the sequence of the embodiments is used only for ease of description, but does not serve as a comparing basis of any embodiment being good or bad.

It can be clearly understood by persons skilled in the art that, to describe conveniently and briefly, for a specific working process of the foregoing-described system, device, modules, and units, reference may be made to a corresponding process in the foregoing method embodiments, which is not repeatedly described here again.

Through the description of the foregoing embodiments, persons skilled in the art may clearly understand that the present invention may be implemented in a manner of software plus a necessary general hardware platform, and definitely may also be implemented through hardware, but the former is a better implementation manner in many cases. Based on such understanding, an essence of the technical solutions of the present invention or a part which is of the technical solutions and makes contributions to the prior art may be embodied in a form of a software product. The computer software product is stored in a storage medium, and includes several instructions which are used to enable a computer device (which may be a personal computer, a server, or a network device) to perform all or a part of steps of the method described in each embodiment of the present invention. The foregoing storage medium includes various medium which can store program codes, such as a USB disk, a mobile hard disk, a Read-Only Memory (ROM), a Random Access Memory (RAM), a magnetic disk, or a compact disk.

It should be understood that in several embodiments provided in this application, the disclosed system, device, and method may be implemented through another manner without departing from the scope of the application. For example, the foregoing-described apparatus embodiments are merely schematic; division of the modules or units is merely division of logical functions and there may be another division manner in actual implementation; and multiple units or components may be combined or may be integrated into another system, or some features may be ignored or not be executed. The units described as stand-alone components may be or may not be separated physically; and the components which is shown as units may be or may not be physical units, namely, they may be located in one place, or may also be distributed on multiple network elements. A part of or all of the modules may be selected to achieve the objective of the solutions of this embodiment according to actual demands. Persons of ordinary skill in the art may understand and implement the embodiments without creative efforts.

In addition, the described system, device, and method and the schematic diagrams of different embodiments may be combined or integrated with another system, module, technology, or method without departing from the scope of the application. In addition, the mutual coupling, direct coupling, or communication connection which are shown or discussed may be implemented through indirect coupling or communication connection between some interfaces, apparatuses or units, and may be in forms of electronic, mechanic, or another form.

The foregoing descriptions are merely specific implementation manners of the present invention, but not intended to limit the protection scope of the present invention. Any variations or replacements that can be easily thought of by those skilled in the art within the technical scope disclosed in the present invention shall fall within the protection scope of the present invention. Therefore, the protection scope of the present invention should be subject to the protection scope of the claims.

What is claimed is:

1. An information processing method, comprising:
   receiving, by a first base station, a handover request message from a second base station;
   determining, by the first base station, whether the handover request message is an initial handover request message directly sent by a source base station in a handover process or a forwarded handover request message; and
   saving, by the first base station, a user equipment, (UE), context in the handover request message so as to become a base station that can be accessed by the UE if the a result of the determining is that the handover request message is the forwarded handover request message, wherein the determining source comprises:
      obtaining information of a base station last visited by the UE from a UE history information element in the received handover request message, wherein the last visited base station is the source base station; and
      comparing, whether the source base station and the second base station are a same base station;
      if the source base station and the second base station are the same base station, determining that the handover request message is the initial handover request message directly sent by the source base station in the handover process; and
      if the source base station and the second base station are not the same base station determining that the handover request message is the forwarded handover request message; whereby forwarding, by the first base station, the handover request message to neighboring base stations, wherein the handover request message carries the number of times that the handover request message is forwarded; and
      if the result is that the handover request message is the forwarded handover request message, obtaining, by the first base station, the number of times that the handover request message is forwarded, wherein the number of times is carried in the handover request message, and comparing the number of times with a preset threshold of the number of times of forwarding; and
      if the number of times of being forwarded is less than the threshold of the number of times of forwarding, adding one to the number of times in the handover request message and forwarding the handover request message to its neighboring base stations.

2. The method according to claim 1, further comprising:
   accumulating, by the first base station, time that elapses when it receives the handover request message;
   when the accumulated time does not reach a first preset threshold, if the first base station receives a reestablishment request message of the UE, sending, by the first base station, a reestablishment command to the UE; and
   when the accumulated time reaches the first preset threshold, if the first base station still does not receive the reestablishment request message from the UE, deleting the handover request message.

3. The method according to claim 1, wherein if the result is that the handover request message is the initial handover request message directly sent by the source base station in the handover process, the first base station is an optimal base station selected by the second base station, and the method further comprises:
   sending, by the first base station, a handover request response message to the second base station, and preparing handover resources for the UE.

4. The method according to claim 3, wherein if the result is that the handover request message is the initial handover request message directly sent by the source base station in the handover process, the method further comprising:
   forwarding, by the first base station, the handover request message to its neighboring base stations.

5. The method according to claim 1, wherein, when the UE is a UE moving at a high speed, the forwarding, by the first base station, the handover request message to its neighboring base stations comprises:
   forwarding, by the first base station, the handover request message to a next base station in a moving direction of the UE.

6. A base station, comprising:
   a receiving module, configured to receive a handover request message sent by another base station;
   a judging module, configured to determine whether the handover request message is an initial handover request message directly sent by a source base station in a handover process or a forwarded handover request message; and a storing module, configured to save a user equipment, (UE), context in the handover request message when a judging result of the judging module is that the handover request message is the forwarded handover request message, wherein the judging module comprises: an obtaining unit, configured to obtain information of a base station last visited by the UE from a UE history information element in the received handover request message, wherein the last visited base station is the source base station; and a comparison unit, configured to compare whether the source base station and the base station that sends the handover request message are the same base station, and in a case that the source base station and the base station that sends the handover request message are the same base station, to determine that the handover request message is the initial handover request message directly sent by the source base station in the handover process; otherwise, to determine that the handover request message is the forwarded handover request message; and wherein a first forwarding module, configured to forward the handover request message to a neighboring base stations of the base station, wherein the handover request message carries the number of times that the handover request message is forwarded; and a second comparison module, configured to, when a judging result of the judging module is that the handover request message is the forwarded handover request message, obtain the number of times that the handover request message is forwarded, wherein the number of times is carried in the handover request message, and to compare the number of times with a preset threshold of the number of times of forwarding; and a second forwarding module, configured to, when the number of times of being forwarded is less than the threshold of the number of times of forwarding, add one to the number of times in the handover request message, and forward the handover request message to its neighboring base stations.

7. The base station according to claim 6, further comprising:

a timing module, configured to accumulate time that elapses when the receiving module receives the handover request message; and an executing module, configured to send a reestablishment command to the UE if the base station receives a reestablishment request message from the UE when the time accumulated by the timing module does not reach a first preset threshold; and to delete the handover request message if the base station still does not receive the reestablishment request message from the UE when the time accumulated by the timing module reaches the first preset threshold.

8. The device according to claim 6, further comprising:

a processing module, configured to, when a judging result of the judging module is that the handover request message is the initial handover request message directly sent by the source base station in the handover process, send a handover request response message to the source base station, and prepare handover resources for the UE.

9. The base station according to claim 8, wherein when the judging result of the judging module is that the handover request message is the initial handover request message directly sent by the source base station in the handover process, the base station further comprising:

a third forwarding module, configured to forward the handover request message to a neighboring base station of the base station.

10. The base station according to claim 9, wherein the third forwarding module is further configured to forward the handover request message to a next base station in a moving direction of the UE when the UE is a UE moving at a high speed.

* * * * *

UNITED STATES PATENT AND TRADEMARK OFFICE
CERTIFICATE OF CORRECTION

PATENT NO. : 8,634,835 B2  Page 1 of 1
APPLICATION NO. : 13/675879
DATED : January 21, 2014
INVENTOR(S) : Weizhi Hu et al.

It is certified that error appears in the above-identified patent and that said Letters Patent is hereby corrected as shown below:

In the Claims

In Col. 11, line 58, claim 1, delete "UE if the a" and insert --UE if the--.

Signed and Sealed this
First Day of April, 2014

Michelle K. Lee
*Deputy Director of the United States Patent and Trademark Office*